W. J. HERRICK.
TRANSMISSION GEAR.
APPLICATION FILED APR. 14, 1915.

1,227,135.

Patented May 22, 1917.
9 SHEETS—SHEET 1.

W. J. HERRICK.
TRANSMISSION GEAR.
APPLICATION FILED APR. 14, 1915.

1,227,135.

Patented May 22, 1917.
9 SHEETS—SHEET 2.

Witnesses:
Robert H. Weir
Harry R. Levhute

Inventor
William J. Herrick
By J. McRoberts
his Atty.

W. J. HERRICK.
TRANSMISSION GEAR.
APPLICATION FILED APR. 14, 1915.

1,227,135.

Patented May 22, 1917.
9 SHEETS—SHEET 5.

Witnesses.

Inventor:
William J. Herrick
By J. M. Roberts
his Atty.

W. J. HERRICK.
TRANSMISSION GEAR.
APPLICATION FILED APR. 14, 1915.

1,227,135.

Patented May 22, 1917.
9 SHEETS—SHEET 6.

W. J. HERRICK.
TRANSMISSION GEAR.
APPLICATION FILED APR. 14, 1915.

1,227,135.

Patented May 22, 1917.
9 SHEETS—SHEET 7.

Witnesses
Robert H. Weir
Harry R. L. White

Inventor
William J. Herrick
By J. M. Roberts
his atty.

W. J. HERRICK.
TRANSMISSION GEAR.
APPLICATION FILED APR. 14, 1915.

1,227,135.

Patented May 22, 1917.
9 SHEETS—SHEET 8.

UNITED STATES PATENT OFFICE.

WILLIAM J. HERRICK, OF CHICAGO, ILLINOIS.

TRANSMISSION-GEAR.

1,227,135.  Specification of Letters Patent.  Patented May 22, 1917.

Application filed April 14, 1915. Serial No. 21,233.

*To all whom it may concern:*

Be it known that I, WILLIAM J. HERRICK, a citizen of the United States, residing at Chicago, in the county of Cook and State of Illinois, have invented certain new and useful Improvements in Transmission-Gears, of which the following is a specification, reference being had therein to the accompanying drawing.

My invention relates to gearing for transmitting motion from any prime motor or source of power to machines, such for example as motor-vehicles or launches, whereby the driven part may be propelled in the same or in a reverse direction from that of the driver and at different speeds.

The invention consists in the novel arrangements and organizations of parts now about to be described and as pointed out in the appended claims.

In the accompanying drawings which exhibit the various features of my invention in practical form, and in which the same reference numerals designate the same or similar parts in the different views.

Figure 3:
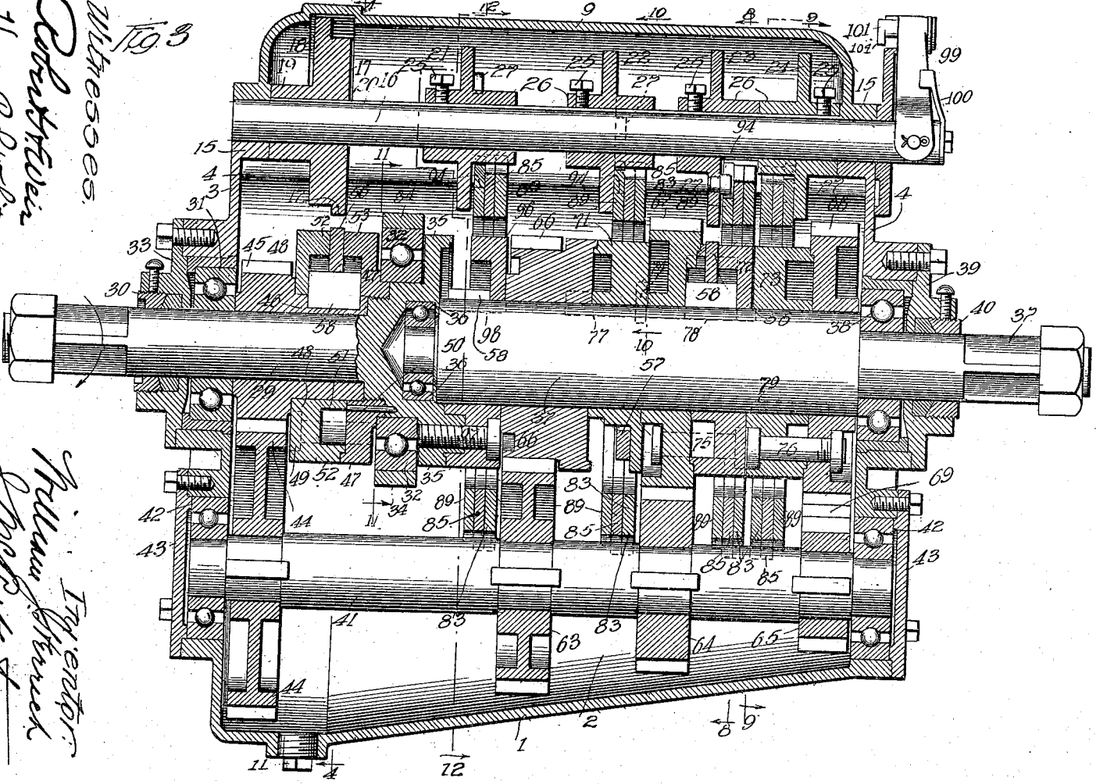
Fig. 3 is a central vertical sectional view on the line 3—3 of Fig. 2.

The operating parts are housed in a rectangular case composed of a trough shaped body 1 having end plates 2, and an inverted trough shaped cover or cap 3 having end plates 4, the cap being secured in place by the cap-screws 5 passing through its flange into screw holes 6 in the flange 7 of the body. The cap is composed of lower and upper sections 8 and 9 secured together by cap-screws 10. The body forms an oil reservoir so that the gears hereinafter described may run in oil, and decreases in depth from front to rear, as viewed in Fig. 3, and is provided at its deepest end with a removable screw plug 11 so that the oil may be drawn off when desired. The case is suitably supported by lateral arms 12, and the sides of its body are offset or shouldered at their top edges as at 13 to provide supporting ledges for an opposite pair of longitudinal rails 14 forming an interior supporting frame for certain of the parts as hereinafter described. The sections of the cap are provided at each end with oppositely curved portions forming bearings 15 for a controller shaft 16, the arrangement being such that when the cap is removed the shaft 16 and the parts carried by it will be removed with it, or when the cap sections are disassembled these parts may be removed by lifting the shaft out. One end of the shaft 16 extends out through the cap so that it may be turned by any convenient means within reach of the operator at his usual position, such for example as those hereinafter described. The shaft 16 carries near its front end a pair of peripheral cams 17 and 18, respectively, of different contours, preferably formed from the same body and whose hub 19 is fixed to the shaft on a key 20. A series of disks having similar peripheral cams 21, 22, 23 and 24 are removably connected to the key of the cam shaft 16 being fixed thereon by suitable set screws 25 passing through their hubs 26, the cams being disposed along the length of the shaft and set at different circumferential points, it being obvious that the hub 19 and the hub 26 of the cam 24 hold the cam shaft 16 against longitudinal displacement by contact with the shaft-bearings in the ends of the cap. Each of the disks 21, 22, 23 and 24 is provided on its body with a projecting pin 27 in the radial line of its associated cam-center, the pins of the cams 21, 22 and 23 facing in the same direction as these cams govern the transmission of motion in the same direction, while the pin of the cam 24 faces in the opposite direction as shown in Fig. 3, as it is the cam for the reverse-direction gear. Each of the hubs 26 is faced off or cut away as shown at 28 for a purpose to be hereinafter described.

Figure 1:
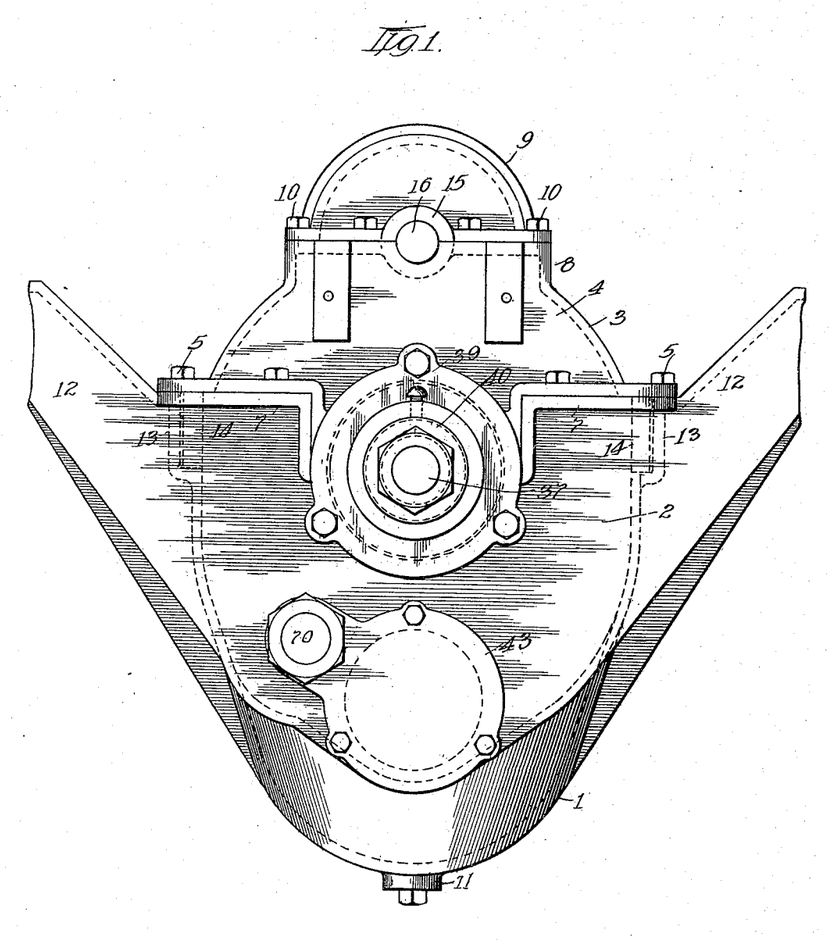
Figure 1 is an end elevation of the case taken at its rear end and showing the general arrangement of parts.
Figure 2:
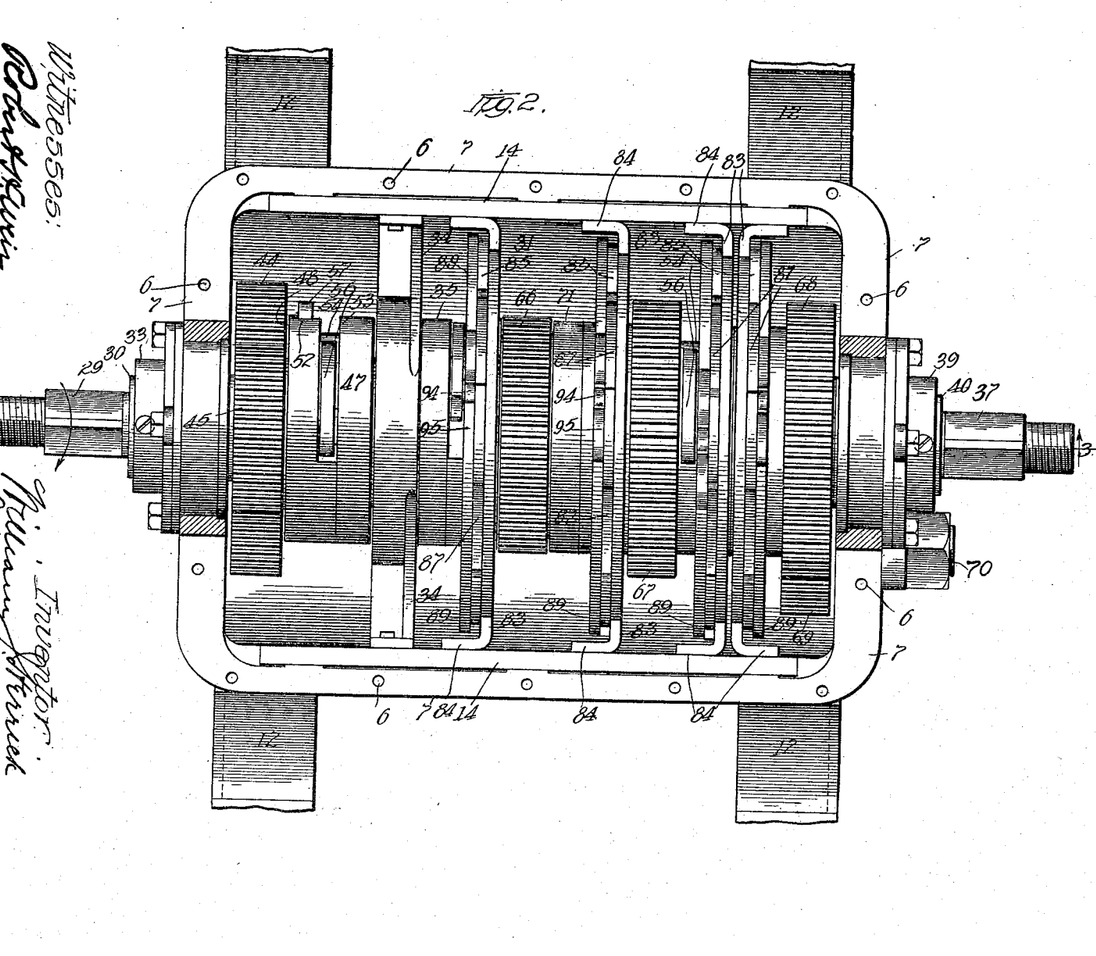
Fig. 2 is top plan view with the casing-cap and its associated parts removed.
Figure 4:
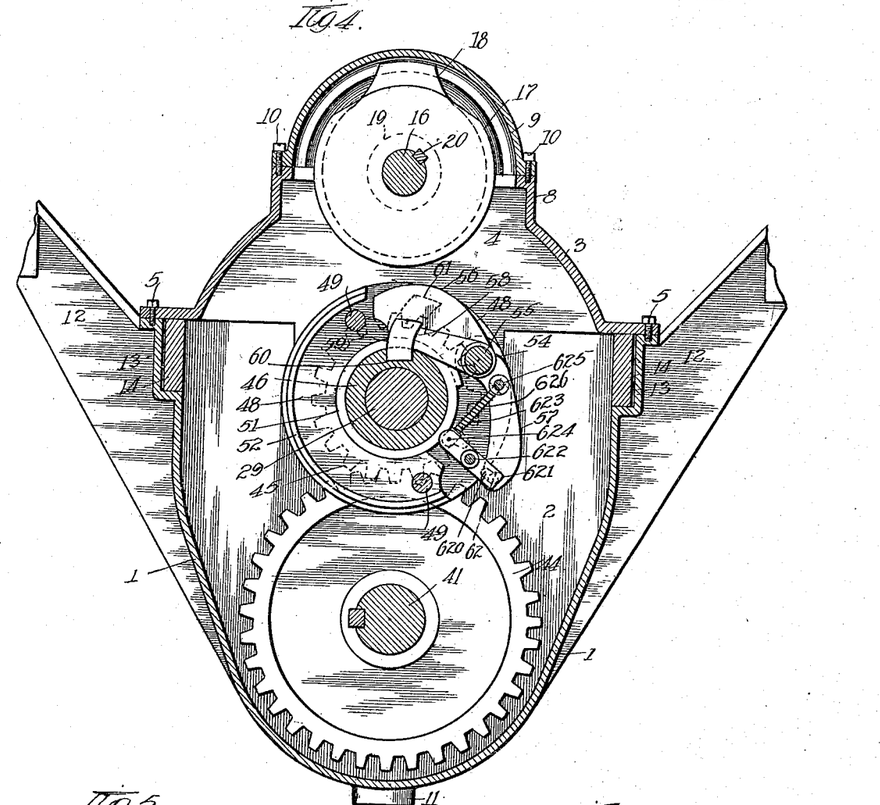
Fig. 4 is a transverse sectional view on the line 4—4 of Fig. 3.
Figures 5, 6:
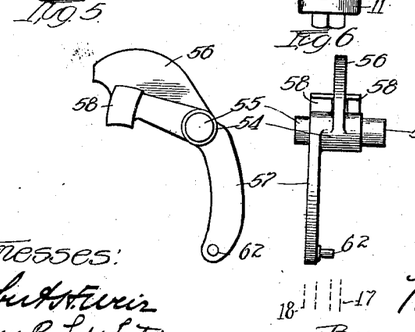
Fig. 5 is a detail side view of the combined latch and radial key employed.
Figs. 6 and 7 are top views of right and left hand latches respectively, employed in the several clutches, the relative location of the throw-in and throw-out cams associated with the right-hand clutch being indicated by dotted lines in the former figure.
Figure 11:
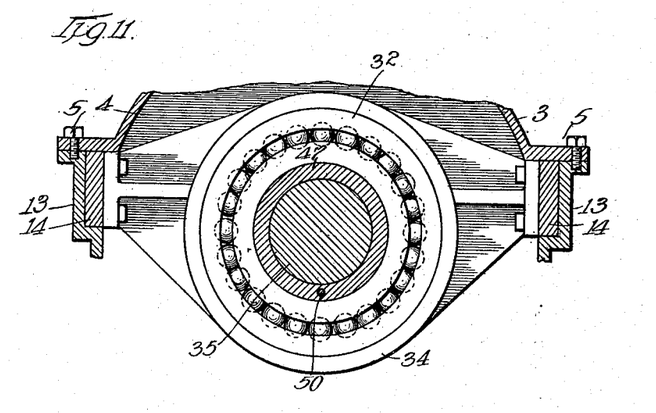
Fig. 11 is a partial transverse sectional view on the line 11—11 of Fig. 3.
Figures 20, 21, 22:
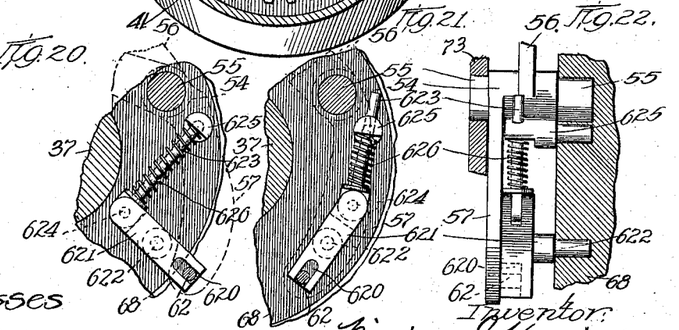
Figs. 20, 21 and 22 are detail views of the latch mechanism in its two positions.

A drive shaft 29 operated from any suitable source of power passes into the front of the case through a suitable stuffing box 30 at approximately the center of the case and is journaled in suitable ball-bearings 31 and 32, the outer ring of the former being carried by a supporting plate 33 bolted to one of the end plates 4, and the outer ring of the latter being carried by a transverse supporting bracket 34 (Figs. 3 and 11) supported at its ends upon the rails 14 and suitably depending into the case to support the enlarged head 35 of the inner end of the shaft. The enlarged head 35 is provided with a plurality of shoulders on its front face to provide bearings for parts hereafter described, and is recessed on its rear face to provide a seat for the outer ring of a ball-bearing 36 for one end of the driven shaft 37, whose other end is journaled in a suitable ball-bearing 38 carried by a plate 39 bolted to the rear end-plate 4, this end of the shaft extending out through the stuffing-box 40 as shown in Fig. 3 for connection with the driven machine. The alined shaft sections 29 and 37 are adapted to be coupled directly together as hereafter described for the direct drive of the latter in the same direction and at the same speed as the former, and they are also adapted to be indirectly coupled together through a lay-shaft 41 to drive the shaft 37 in the same direction as, but at different speeds from, the shaft 29, and also to drive the shaft 37 in the reverse direction. In the form shown I provide for three different speeds of the driven shaft 37 in one direction, and for its single speed in the opposite direction, though it is obvious that the number of speeds may be varied by varying the necessary parts comprising a unit normally employed therefor; the direct drive of shaft 37 provides the high forward speed, while its indirect drive provides the low and medium or intermediate forward speeds and the reverse speed. The lay-shaft 41 is suitably journaled at each end in the lower part of the case in ball-bearings 42 carried and held in place by plates 43 bolted to the end plates 4, and is provided at its front end with a fixed gear 44 meshing with a gear 45 on a hub 46 rotatably mounted on the shaft 29 between the end plate 4 and the first shoulder of the head 35. The shaft 29 is coupled with and uncoupled from the gear 45 by clutching means operated by the cams 17 and 18 on the controller shaft, and in the form illustrated this is accomplished by a latch carried by the shaft 29 and adapted to engage and disengage the gear 45, thereby transmitting motion to lay-shaft 41 when the parts are engaged. For this purpose a latch-housing is provided composed of a pair of spaced disks 47 and 48 connected together by bolts 49, and fixed by a threaded connection and pin 50 (Fig. 3) to the second shoulder of the head 35 of the drive shaft 29. The housing has an inner sleeve 51 rotatably mounted on the hub 46, and inwardly directed or offset peripheral flanges 52 and 53 to form the peripheral wall of an interior latch chamber. The latch (Figs. 5 and 6) comprises a body 54 pivotally mounted in the chamber by means of suitable pintles 55 loosely journaled in the opposite sides of the housing, and a pair of oppositely extending head and tail wings 56 and 57, respectively, which are offset from each other in different vertical planes and are adapted to be extended through a slot in the peripheral wall of the housing into the paths of the cams 17 and 18, respectively. The head wing 56 carries a key 58 on its underside which is adapted to pass through an opening 59 in the sleeve 51 of the housing to engage a key-way 60 in the hub 46 as shown in Fig. 4, and the key is extended laterally on both sides of the wing 56 to engage in opposite grooves 61 in the disks 47 and 48 composing the side walls of the housing curved on the arc of a circle whose center is that of the pivot of the latch, so that when the key is in its operative position it acts directly between the hub 46 and the sleeve of the housing to transmit the force of the latter as the driving member directly to the former as the driven member and to remove all strain from the other parts of the latch. The latch after being initially moved by either cam 17 or 18 is thrown to and held in its extreme positions by a spring. The tail of the latch carries a pin 62 movable in a slot 620 in the outer end of an arm 621 pivoted at 622 in the housing and carrying at its inner end a rod 623 pivoted thereto at 624; the free end of the rod passes freely through a guide 625 rotatably mounted in the housing, and a coilspring 626 on the rod re-acts between the guide and arm. The arrangement is such that the spring reacting against the bracket 625 and inner end of arm 621 throws the latter to the extreme of its movement on either side of pivot 622 (Figs. 20 and 21) when its outer end is moved by the latch-tail 57 about the pivot as the tail swings in and out of the housing under the action of the cams 17 and 18, respectively, and the spring thus moves the latch through its final movement in either direction and holds it in either of its positions. The latch employed in the present location is a right-hand latch (Fig. 6) in which the head 56 lies at the right side of its tail. The head 56 is deep enough to extend outside the housing when its key rests on the sleeve 51 and its upper curved edge then lies in the effective radius of the throw-in cam 17, the arrangement being such that when this cam is set in its operative position it acts on the head 56 to throw the key down through the opening 59 in the sleeve 51 into contact with the periphery of the hub 46, in which position the inner end of the arm 621 is thrown inwardly across its pivot to permit the spring to force the key down in its path 61, and when the key revolving with the head 35 of the drive shaft reaches its key-way 60 in the hub 46 the spring 626 moves the key into its way to engage the gear 45 (Fig. 4) so that the latter is rotated to turn the lay-shaft 41. The arrangement of the parts is such that while the throw-in cam 17 is set the key 58 is in effect locked in its way, as in the event it tends to leave its way the cam prevents the head 56 from rising far enough to neutralize the depressing effect of the spring which holds the key in its way. The depression of the key into its way projects the tail 57 outwardly as shown in Figs. 2 and 4, but the contours of the cams 17 and 18 are such that the latter remains inoperative so long as the former is in its operative position, the contours and relations of these cams being shown in Fig. 4. When the controller shaft 16 is turned to rotate cam 17 to its inoperative position, it sets the throw-out cam 18 in operative position to engage the tail 57 to disengage the key 58 from the hub 46, and the cam 18 is deep enough to retract the key to the top of its path 61 out of engagement with the hub 46, or to move the latch sufficiently to throw the inner end of the arm 621 outwardly across its pivot, when the spring 626 holds the key in retracted position. The contour of the throw-in cam 17 is such that when in operative position it stands in the path of the head 56 and so prevents disengagement of the key and hub 46 during the major part of the motion of the controller shaft, thereby insuring the drive of the lay-shaft 41 at the various positions of the controller shaft for the selective cams for the different speeds or movements of the driven shaft 37, and the contour of the throw-out cam 18 is such that when in operative position it stands in the path of the tail 57 and prevents the engagement of the key and hub when the lay-shaft is not to be driven. The latch is thus in effect locked in both its positions. A bank of gears 63, 64 and 65 of different sizes is keyed on the lay-shaft 41, and a second bank of gears 66, 67 and 68 is loosely mounted on the driven shaft 37, the gears 67 and 68 being of the same size and preferably larger than the gear 66; the gears 63 and 64 mesh respectively with the gears 66 and 67, and the gear 68 is driven from the gear 65 so as to revolve in a direction opposite to the direction of the other loose gears by means of an interposed idle gear 69 loosely mounted on a stub-shaft 70.

Figure 7:
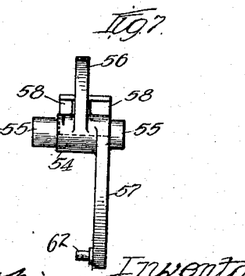
Figure 8:
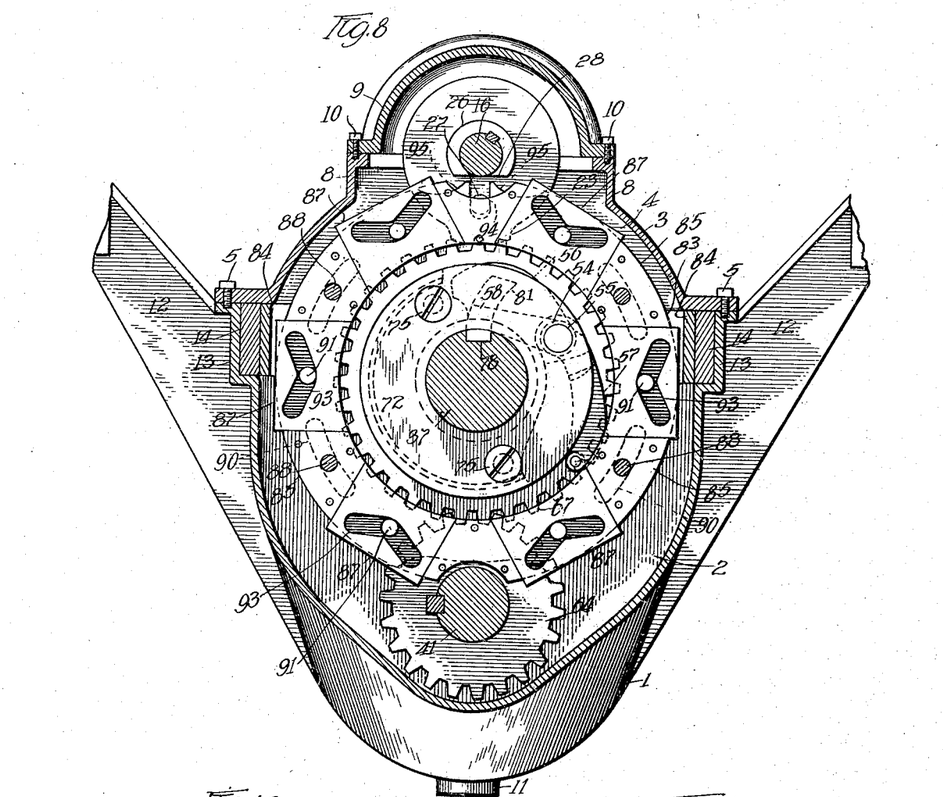
Fig. 8 is a transverse sectional view on the line 8—8 of Fig. 3 with the parts in their relation for low forward speed.
Figure 9:
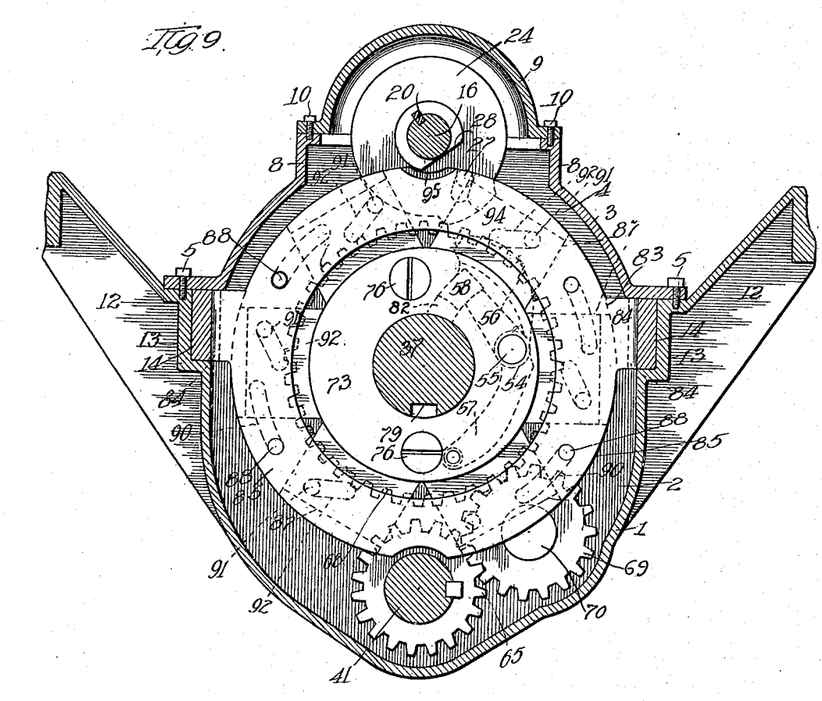
Fig. 9 is a transverse sectional view on the line 9—9 of Fig. 3 showing the parts in their relation when the controller-shaft is approaching reverse speed position.
Figure 10:
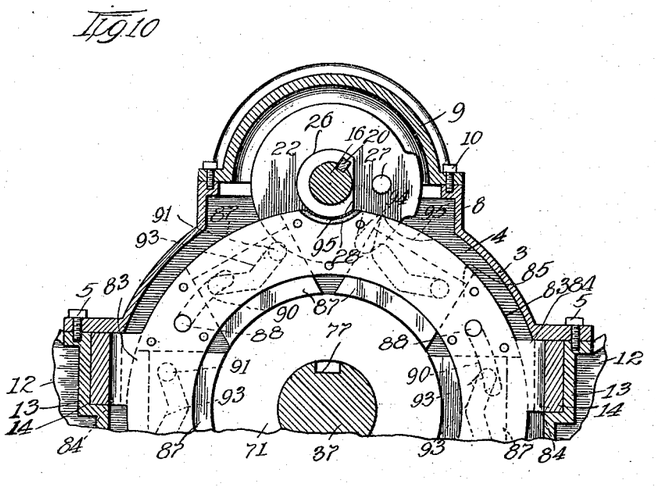
Fig. 10 is a partial transverse sectional view on the line 10—10 of Fig. 3.
Figure 12:
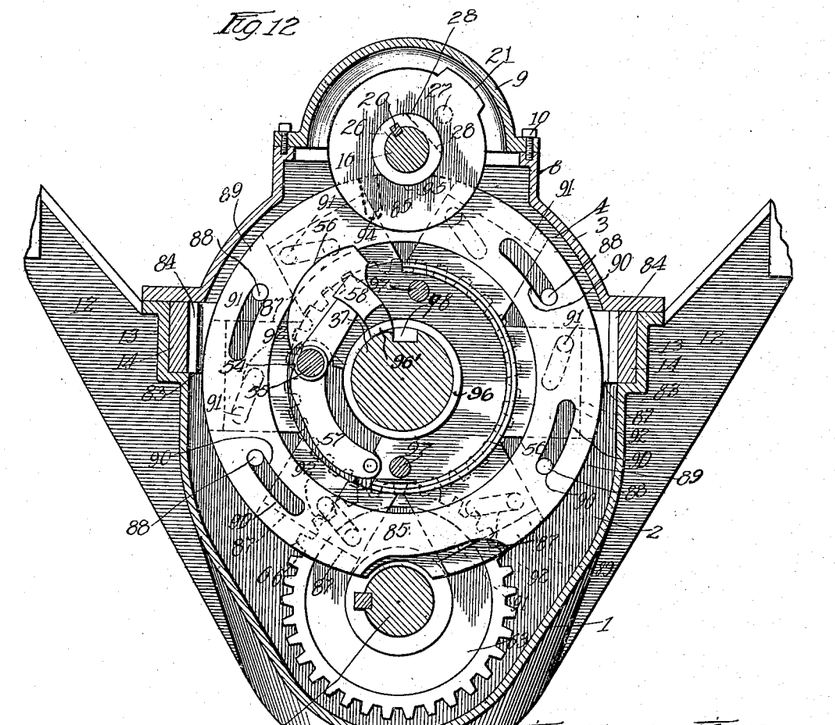
Fig. 12 is a transverse sectional view on the line 12—12 of Fig. 3.
Figures 13, 14:
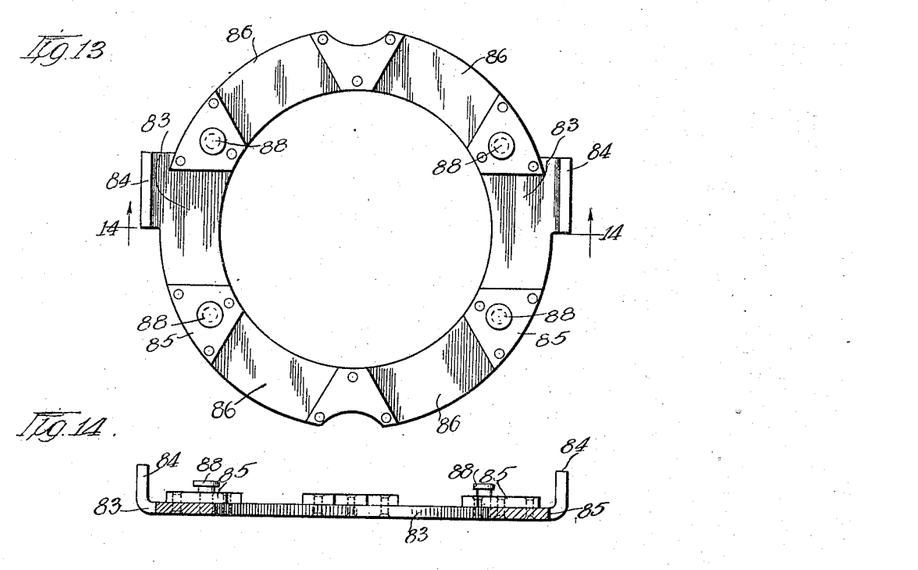
Fig. 13 is a view in elevation showing one of the annular holders employed.
Fig. 14 is a sectional view on the line 14—14 of Fig. 13.
Figure 15:
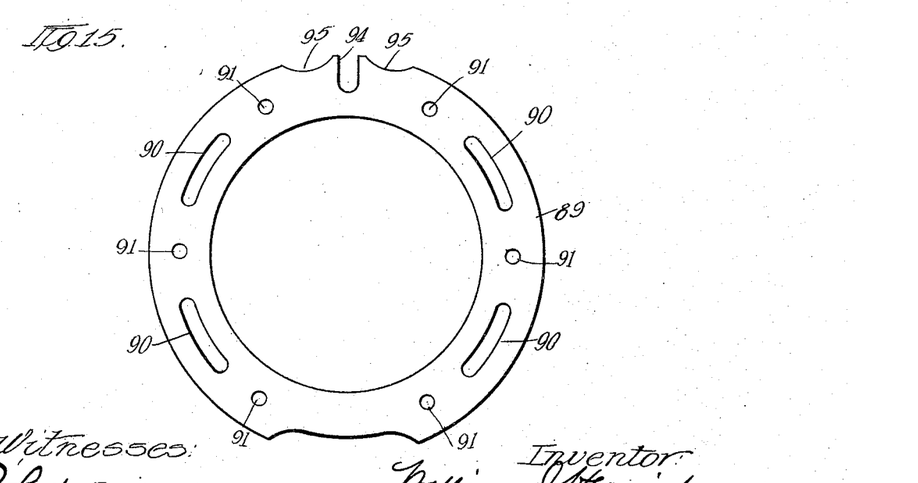
Fig. 15 is a view in elevation of one of the cam rings movably mounted on the holders.
Figure 16:
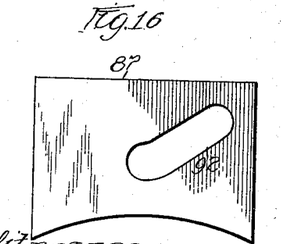
Figs. 16 and 17 are detail views of two of the slides used on different holders.
Figures 17, 18:
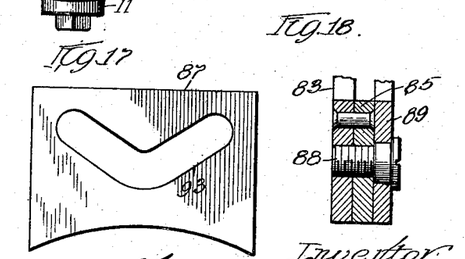
Fig. 18 is a detail sectional view through one of the holders and its cam-ring.

Each of the gears 66, 67 and 68 is coupled to and uncoupled from the driven shaft 37 by clutching means comprising a left-hand latch (Fig. 7) and its associated parts similar to the parts employed between the drive shaft 29 and the gear 45, the latches being carried by the gears and operated from the associated selective cams 22, 23 and 24 on the controller shaft. Each gear 66, 67 and 68 carries a latch-housing whose walls are formed by the opposing face of the gear and an associated disk 71, 72 and 73, respectively, the parts of each housing being bolted together by bolts 74, 75 and 76, respectively, with the associated latches pivotally arranged in the respective chambers formed thereby, and adapted to have their keys 58 pass through similar openings in the inner wall or hub of the associated housing to engage key-ways 77, 78 and 79, respectively, and with their wings arranged to pass through peripheral slots in the chambers as before. In the figures showing these various arrangements the parts of the latch devices are designated by the same reference numerals for convenience of illustration, and their keys 58 move in similar curved grooves cut in the opposing walls of their housings, as shown at 81 and 82 for example. At the housing of each gear 66, 67 and 68 a transverse holder, preferably in the form of an annulus 83 (Fig. 13), is arranged with its ends fixed to the side rails 14 by ears 84, and its ring surrounding the shaft 37 and its connected parts. Each holder carries a plurality of tracks 85 providing intermediate radial ways 86 in which slides 87 are movably located, and also a plurality of shouldered studs 88 upon which a cam-ring 89 is mounted for concentric movement by elongated slots 90, the heads of the studs holding the cam-ring in place against the faces of the tracks 85 on the annulus with the slides between the annulus and ring (Fig. 18). Pins 91 fixed on the movable cam-rings enter diagonal slots in the slides to move the latter radially to and from the latches, it being understood that the slides of each ring lie in the plane of the tail of an associated latch; the diagonal slots 92 in the slides associated with the latch for the gear 68 extend only in one direction (Figs. 9 and 16) as this is the reverse gear and the arrangement of the parts is such that the reverse position of the controller shaft is at one of the extremes of its movement and so the approach to this position is always in the same direction or by turning the controller shaft in one direction, while the slots 93 in the slides associated with the gears 66 and 67 are oppositely inclined or extend in two directions away from a common center (Figs. 8, 10 and 17) as these are the gears for medium and low speeds respectively and the arrangement of the parts is such that the approach to either of these positions may be from either side or by turning the controller shaft in either direction. Each cam-ring is also provided with a radial slot 94 in the path of the pin 27 on its associated selective cam on the controller shaft 16, and each ring and its associated cam are provided with interlocking means, preferably formed by the convex cam-hub 26 and concave notches 95 in the rings corresponding to the curvature of the hubs, so that when any one of the cams 22, 23 or 24 is turned to inoperative position its hub will interlock with the cam-ring to prevent movement of the latter (Figs. 9 and 10) but when a cam is turned to operative position the faced-off portion 28 of the hub will unlock the ring to permit the stud 27 on entering the slot 94 to move the ring (Fig. 8). The ring associated with the gear 68 has only a single notch 95 at one side of its slot 94 for the same reason that the slots 92 of its slides are only one-way slots, while the rings associated with the gears 66 and 67 have notches on opposite sides of their slots 94 for the same reason that the slots 93 of their slides, are two-way slots. The parts are arranged with the head wings 56 of their respective latches in the paths of their respective selective cams, and the tail wings in the paths of their respective slides. When the latches are disconnected from the shaft 37, the cam rings 89 stand in locked position (Figs. 10 and 12 for example) with the pins 91 at the outer ends of their slots 92 or 93 (as the case may be) to hold the associated slides 87 in their inward position, and as the slides are in the path of the latch tails 57 they lock the latches in inoperative position to hold their keys out of the associated key-ways in the shaft 37, whereby the latter is not revolved. When the controller shaft is turned to its position to set any one of its selective cams 22, 23 or 24, as in Fig. 8 for example, the associated cam-ring 89 is released by the disengagement of the parts 26 and 95, and the pin 27 of the selected cam enters its associated slot 94 to turn its cam-ring, and the pins 91 of the ring will move the slides 87 to their outward position (Fig. 8) to release the tail wing 57, and the selected cam 22, 23 or 24, as the case may be, will then pass to position in the path of the head wing 56, and as the associated gear 66, 67 or 68 is rotated from shaft 41 its latch will move under its cam and be pressed by it into contact with the inner wall of its housing and when the latch-key 58 reaches the opening therein it will be forced by the latch-spring into the associated key-way of the shaft 37 to revolve the latter. The engaged or operative position of the parts is shown in Fig. 8 where the low gear 67 is coupled to the shaft 37, and it will be obvious that the same result is obtained for either gear 66 or 68 according as its selective cam is moved to operative position, the selective cams 22, 23 and 24 being of course set at different points around the controller shaft so that when any one of them is in its operative position the others will be in their inoperative positions, and the relative contours of cams 17 and 18 being such that the latter remains in its inoperative position and the former in its operative position when the controller shaft brings any of the cams 22, 23 or 24 into its operative position. By this organization shaft 37 may be selectively driven at low and intermediate speeds in the same direction as shaft 29, and in reverse direction thereto.

To drive the shaft 37 directly from shaft 29 for high speed in the same direction, the cam shaft 16 is set in position to have the throw-out cam 18 release the latch shown in Fig. 4, so that the gear 45 and the lay-shaft 41 stand idle, and the cams 18 and 21 are so related that in this position of the cam 18 the selective cam 21 operates on an associated latch (Fig. 12) in a housing formed by the head 35 and a disk 96 bolted thereto at 97, to couple the housing to the shaft 37, this latch is similarly locked and unlocked by a set of slides 87 mounted in the radial ways in a holder 83 and having one-way diagonal slots 92 to receive the slide-operating pins 91 in a movable cam-ring 89, the arrangement of parts being similar to those (Fig. 9) for the gear 68, but with the slots 92 oppositely directed and the interlocking notch 95 on the opposite side of slot 94, as the approach to the high speed position is in the opposite direction. When the cam 21 stands idle its hub 26 interlocks with the notch 95 of its cam-ring to hold the slides in their inward position so that the tail wing 57 of its latch is locked in position in the housing and the latch does not engage the shaft 37 (Fig. 12), but when the cam 21 is moved to operative position the cut-away portion 28 of its hub releases the cam-ring and the pin 27 engages the slot 94 to move the ring to withdraw the slides to release the latch, and the cam 21 depresses its latch head so that the latter in its revolution with its housing on the head 35 reaches the opening 96' in the inner wall of its housing its spring snaps its key into engagement with the key-way 98 in the shaft 37 to revolve the latter. When the cam 21 is moved back to inoperative position its pin 27 rotates the cam-disk back to original position to interlock with hub 26 and cause the slides to move inwardly and engage the latch tail 57 to withdraw the key 58 from the key-way 98 to release the shaft 37 and to lock the latch in its inoperative position all the time the lay-shaft may be operated. In short, when cam 21 is unlocked and operates on its latch to connect the shafts 29 and 37 for direct drive of the latter the throw-out cam 18 is operative so that the lay-shaft cannot be turned, and when cam 21 is locked and inoperative to disconnect the shafts 29 and 37 the throw-in cam 17 is operative so that the lay-shaft may be turned to indirectly drive the shaft 37.

Figure 19:
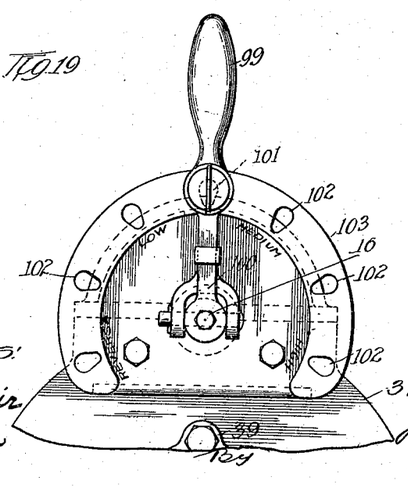
Fig. 19 is a view of a suitable operating handle and its dial for the selective-cam shaft.

The controller shaft may be operated by any suitable means, and in case the device is employed for automobiles it will be moved by any convenient connection operated by the driver from his seat. In the form shown in the drawings I provide it with a handle 99 suitably pinned thereto to have a slight swinging movement and engaged by a spring 100 to hold its pin 101 in any one of a series of holes 102 in an indicating plate 103 which is appropriately marked to indicate the several positions of the controller shaft. If desired the parts may be locked in any selected position by any suitable means, as by forming the pin with a projection 104 adapted to interlock behind the plate 103 when the pin 101 is turned in the handle. In the form shown the "high" speed position is at one end of the indicator, the "medium" or second speed position is next, then the "low" speed position, and at the other end of the indicator the "reverse" speed position, with "neutral" positions indicated between the speed positions. When the handle is set at "high" speed, the throw-out cam 18 is in position to engage the tail 57 of its latch and withdraws its key from the gear 45 so that the latter is uncoupled from the shaft 29 and the lay-shaft 41 is idle, and the cam 21 insures the direct engagement of its latch on the housing on the head 35 of the shaft 29 with shaft 37 to directly drive the latter at the speed of the drive shaft 29. The contour of the throw-in cam 17 is such that it does not affect the latch in this position of the parts or when the controller shaft is turned to the first neutral position; in this neutral position the lay-shaft is therefore still disengaged, and the movement of the "high" cam 21 when the controller shaft goes to this position rotates its cam ring to move its slides inwardly to lock the associated latch tail with its key withdrawn, whereby the shafts 29 and 37 are disengaged. When the controller shaft is moved to "medium" or intermediate speed position the throw-in cam 17 engages its latch to lock the gear 45 to the shaft 29 to rotate the lay-shaft 41 through the gear 44, and the "medium" cam 22 moves its cam-ring to withdraw its slides away from the associated latch tail and also moves its latch head to couple the gear 66 to shaft 37. When the controller shaft is moved to the next neutral position, the cam 22 moves out of the path of its latch head and rotates its cam ring back to its locked position on its hub 26, which moves its slides inward into the path of the latch tail to release the latch from shaft 37, the slides locking the latch in released position. The contour of the cam 17 is such that it remains active on its latch in all positions of the controller shaft from "medium" to "reverse" and back to "medium," so that the lay-shaft 41 is rotated at all these positions. When the controller is moved to "low" position the "low" cam 23 moves its cam ring to withdraw its slides from the path of the associated latch tail and also moves its latch head to couple the gear 67 to shaft 37. When the controller shaft is moved to the next neutral position the cam 23 moves out of the path of its latch head and rotates its cam ring back to its locked position on its hub 26 which moves its slide inward into the path of the latch tail to release the latch from shaft 37. When the controller shaft is moved to "reverse" position the reverse cam 24 moves its cam ring to withdraw its slides from the path of the associated latch tail and also moves its latch head to couple the gear 68 to shaft 37, whereby through the interposed idle gear 69 the shaft 37 is reversely rotated. Return of the controller shaft to the neutral position adjacent the "reverse" position releases the latch head of gear 68 from the shaft 37. The several cams on the controller-shaft are suitably disposed to coöperate with their associated parts to produce the above described operations and effects when the shaft is moved to its different positions, and the relative arrangement of the cams may of course be varied to correspond with different arrangements of various speed units. In the practical use of the invention the controller shaft may pass from one active position to another without dwell at any intermediate neutral position, as the slides 87 of each latch lock it in inoperative position at all times except when the controller shaft is set at the proper position for that particular latch to operate. Also, as each latch is momentarily held in inoperative position by its housing when the control-device is in position for its unlocking, the control-device may be shifted from any active position to any other without stopping at an intermediate active position and without picking up an intermediate latch so that all danger of throwing in the wrong latch is obviated. For example, the change from high speed to low speed may be made without picking up the intermediate latch for medium speed. Thus the control-device may go from any point to another without stopping at an intermediate point and without picking up an intermediate latch. The slots 92 in the slides and the notches 95 in the cam rings for the latches corresponding to the extreme positions, as here the "high" and "reverse" positions, extend only in one direction as the approach to either of these extreme positions is always from the same direction, but the slots 93 in the slides for the other latches are oppositely inclined as the approach to each of these positions may be from a neutral position at either side thereof, and the notches 95 in their cam rings are arranged in pairs for the same reason.

I claim:—

1. In a device of the class described, a drive shaft, a driven shaft, a clutch to couple and uncouple said shafts, a lay shaft, selective connections between the lay shaft and driven shaft to drive the latter at different speeds, a clutch between the lay shaft and the drive shaft comprising a pivoted latch, a clutch-selecting device, a cam controlled by said selecting device to hold said latch in operative position, and slides controlled by said selecting device to hold said first clutch in inoperative position.

2. In a device of the class described, a drive shaft, a driven shaft, a clutch to couple and uncouple said shafts, a lay shaft, selective connections between the lay shaft and driven shaft to drive the latter at different speeds, a clutch between the lay shaft and the drive shaft, a clutch-selecting device, means controlled by said selecting device to hold said second clutch in operative position, and slides controlled by said selecting device to hold said first clutch in inoperative position.

3. In a device of the class described, a drive shaft, a driven shaft, a clutch to couple and uncouple said shafts comprising a pivoted latch, a lay shaft, selective connections between the lay shaft and driven shaft to drive the latter at different speeds, a clutch between the lay shaft and the drive shaft, a clutch-selecting device, means controlled by said selecting device to hold said second clutch in operative position, and slides controlled by said selecting device to hold said latch in inoperative position.

4. In a device of the class described, a drive shaft, a driven shaft, a clutch to couple and uncouple said shafts comprising a pivoted latch, a lay shaft, selective connections between the lay shaft and driven shaft to drive the latter at different speeds, a clutch between the lay shaft and the drive shaft, a clutch-selecting device, means controlled by said selecting device to hold said second clutch in operative position, radially movable slides to hold the latch in its uncoupling position, and means operated by the selecting device to move the slides to uncouple the latch.

5. In a device of the class described, a drive shaft, a driven shaft, a clutch to couple and uncouple said shafts comprising a pivoted latch, a lay shaft, selective connections between the lay shaft and driven shaft to drive the latter at different speeds, a clutch between the lay shaft and the drive shaft, a clutch-selecting device, means controlled by said selecting device to hold said second clutch in operative position, radially movable slides to hold the latch in its uncoupling position, said slides having diagonal slots, a cam-ring having pins in said slots, and means controlled by said selective device to actuate the ring.

6. In a device of the class described, a drive shaft and a driven shaft, a lay shaft, a clutch to couple and uncouple said lay shaft and drive shaft comprising a pivoted latch, a controller shaft, a pair of cams on the controller shaft to oppositely operate the latch, the throw-in cam being operative during the major portion of the movement of the controller shaft, selective connections between the lay shaft and driven shaft, and means controlled by said controller shaft for selecting said connections while the throw-in cam is operative.

7. In a device of the class described, a drive shaft and a driven shaft, a lay shaft, a clutch to couple and uncouple said lay shaft and drive shaft comprising a pivoted latch having offset head and tail wings, a controller shaft, a pair of cams on the controller shaft to oppositely operate the wings of the latch, the throw-in cam being operative during the major portion of the movement of the controller shaft, a spring to hold the latch in either position, selective connections between the lay shaft and driven shaft, and means controlled by said controller shaft for selecting said connections while the throw-in cam is operative.

8. In a device of the class described, a drive shaft and a driven shaft, a lay shaft, a clutch to couple and uncouple said lay shaft and drive shaft comprising a pivoted latch, a spring to hold the latch on either side of its pivot, a controller shaft, a pair of cams on the controller shaft to oppositely operate the latch, the throw-in cam being operative during the major portion of the movement of the controller shaft, selective connections between the lay shaft and driven shaft, and means controlled by said controller shaft for selecting said connections while the throw-in cam is operative.

9. In a device of the class described, a drive shaft, a driven shaft having a way, a lay shaft, selective connections between the lay shaft and driven shaft to drive the latter at different speeds, a clutch between the lay shaft and the drive shaft, a clutch between each selective connection and the driven shaft comprising a housing loose on the shaft and having an opening registering with the way at each revolution of the housing on the shaft, a latch pivoted in the housing and movable toward and away from the shaft and extending through the opening, and means to operate the latch to cause it to engage the way.

10. In a device of the class described, a drive shaft, a driven shaft, a lay shaft, selective connections between the lay shaft and driven shaft to drive the latter at different speeds, a clutch between the lay shaft and the drive shaft, a clutch between each selective connection and the driven shaft comprising a rotating member, a latch pivoted on the rotating member and having wings in different planes, and means to alternately engage the wings of the latch to couple and uncouple the latch and shaft, the said uncoupling means also locking the latch in its uncoupled position.

11. In a device of the class described, a drive shaft, a driven shaft, a lay shaft, selective connections between the lay shaft and driven shaft to drive the latter at different speeds, a clutch between the lay shaft and the drive shaft, a clutch between each selective connection and the driven shaft comprising a rotating member, a latch pivoted on the rotating member and having wings in different planes, a cam to engage the coupling wing of the latch, and a radially moving device to engage the uncoupling wing of the latch.

12. In a device of the class described, a drive shaft, a driven shaft, a lay shaft, selective connections between the lay shaft and driven shaft to drive the latter at different speeds, a clutch between the lay shaft and the drive shaft, a clutch between each selective connection and the driven shaft comprising a driving member, a latch pivoted on the driving member and having wings in different planes, a cam to engage the coupling wing of the latch, radially moving slides to engage its uncoupling wing, and a selecting device to move the cam and slides to couple and uncouple the latch and shaft.

13. In a device of the class described, a drive shaft, a driven shaft, a lay shaft, selective connections between the lay shaft and driven shaft to drive the latter at different speeds, a clutch between the lay shaft and the drive shaft, a clutch between each selective connection and the driven shaft comprising a rotating member, a latch pivoted on said member and having oppositely extending wings in different planes, a cam to engage the coupling wing, radially moving slides to engage the uncoupling wing, means to actuate the slides, and means on the cam to move the slide-actuating means.

14. I na device of the class described, a drive shaft, a driven shaft, a lay shaft, selective connections between the lay shaft and driven shaft to drive the latter at different speeds, a clutch between the lay shaft and the drive shaft, a clutch between each selective connection and the driven shaft comprising a rotating member, a latch pivoted on said member and having oppositely extending wings in different planes, a cam to engage the coupling wing, radially moving slides to engage the uncoupling wing having diagonal slots, a cam-wing having pins in said slots, and means on the cam to actuate the ring.

15. In a device of the class described, a drive shaft, a driven shaft, a lay shaft, selective connections between the lay shaft and driven shaft to drive the latter at different speeds, a clutch between the lay shaft and the drive shaft, a clutch between each selective connection and the driven shaft comprising a rotating member, a latch pivoted on the rotating member and having wings in different planes, a shaft having a cam to engage the coupling wing, movable means to engage the uncoupling wing, and connections between said movable means and camshaft to move said means in one position of the shaft and to lock them in its other positions.

16. In a device of the class described, a drive shaft, a driven shaft, a lay shaft, selective connections between the lay shaft and driven shaft to drive the latter at different speeds, a clutch between the lay shaft and the drive shaft, a clutch between each selective connection and the driven shaft comprising a rotating member, a latch pivoted on the rotating member and having a pair of oppositely extending wings in parallel planes, a shaft having a cam to engage the coupling wing, a holder having radially movable slides to engage the uncoupling wing, diagonal slots in said slides, a cam-ring on the holder having pins in said slots and provided with a radial slot and peripheral notch, a pin on the cam engaging the slot, and an interlocking sleeve on the cam engaging the notch.

17. In a device of the class described, a rotating shaft, a bank of diversely sized gears rotating therewith, an opposite bank of diversely sized gears driven from the first gears, a shaft on which the second gears are loosely mounted, a latch pivoted on each loose gear and having a pair of oppositely extending wings in parallel planes, a shaft having selective cams to couple the latches and shaft, and selective devices operated by said cam-shaft to uncouple the latches and lock them in uncoupled position.

18. In a device of the class described, a driving shaft, a driven shaft, a bank of gears of different sizes on the driving shaft, an opposite bank of gears of different sizes loose on the driven shaft and driven from the first gears, a latch on each loose gear having opposite off-set wings to lock and unlock the latch and driven shaft, a controller shaft provided with a plurality of selective cams to lock the associated latches to the driven shaft, and a plurality of selective devices operated by said cam-shaft to uncouple the latches and lock them in uncoupled position.

19. In a device of the class described, a driving shaft, a driven shaft, a bank of gears of different sizes on the driving shaft, an opposite bank of gears of different sizes loose on the driven shaft and driven from the first gears, an idler to rotate one of the loose gears in a direction opposite to the others, a latch on each loose gear having opposite offset wings to lock and unlock the latch and driven shaft, a controller shaft provided with a plurality of selective cams to lock the associated latches to the driven shaft, and a plurality of selective devices operated by said cam-shaft to uncouple the latches and lock them in uncoupled position.

20. In a device of the class described, a rotating shaft, a bank of gears of different sizes on the shaft, a driven shaft, an opposite bank of gears of different sizes loose on the driven shaft, a clutch between the driven shaft and each of its gears comprising a rotating member and a latch pivoted on the rotating member and having wings in different planes, and means to alternately engage the wings of the latch to couple and uncouple the latch and shaft, the said means also locking the latch in its uncoupled position.

21. In a device of the class described, a rotating shaft, a bank of gears of different sizes on the shaft, a driven shaft, an opposite bank of gears of different sizes loose on the driven shaft, a clutch between the driven shaft and each of its gears comprising a rotating member and a latch pivoted on the rotating member and having wings in different planes, a cam to engage the coupling wing of the latch, a movable device to engage the uncoupling wing of the latch, and means to actuate said movable device.

22. In a device of the class described, a rotating shaft, a bank of gears of different sizes on the shaft, a driven shaft, an opposite bank of gears of different sizes loose on the driven shaft, a clutch between the driven shaft and each of its gears comprising a driving member and a latch pivoted on the driving member and having wings in different planes, a cam to engage the coupling wing of the latch, radially moving slides to engage its uncoupling wing, and a selecting device to move the cam and slides to couple and uncouple the selected latch and shaft.

23. In a device of the class described, a rotating shaft, a bank of gears of different sizes on the shaft, a driven shaft, an opposide bank of gears of different sizes loose on the driven shaft, a clutch between the driven shaft and each of its gears comprising a rotating member and a latch pivoted on said member and having oppositely extending wings in different planes, a cam to engage the coupling wing, radially moving slides to engage the uncoupling wing, means to actuate the slides, and means on the cam to move the slide-actuating means.

24. In a device of the class described, a rotating shaft, a bank of gears of different sizes on the shaft, a driven shaft, an opposite bank of gears of different sizes loose on the driven shaft, a clutch between the driven shaft and each of its gears comprising a rotating member and a latch pivoted on said member and having oppositely extending wings in different planes, a cam to engage the coupling wing, radially moving slides to engage the uncoupling wing having diagonal slots, a cam-ring having pins in said slots, and means on the cam to actuate the ring.

25. In a device of the class described, a rotating shaft, a bank of gears of different sizes on the shaft, a driven shaft, an opposite bank of gears of different sizes loose on the driven shaft, a clutch between the driven shaft and each of its gears comprising a rotating member and a latch pivoted on the rotating member and having wings in different planes, a shaft having a cam to engage the coupling wing, movable means to engage the uncoupling wing, and connections between said movable means and cam-shaft to move said means in one position of the shaft and to lock them in its other position.

26. In a device of the class described, a rotating shaft, a bank of gears of different sizes on the shaft, a driven shaft, an opposite bank of gears of different sizes loose on the driven shaft, a clutch between the driven shaft and each of its gears comprising a rotating member and a latch pivoted on the rotating member and having a pair of oppositely extending wings in parallel planes, a shaft having a cam to engage the coupling wing, a holder having radially movable slides to engage the uncoupling wing, diagonal slots in said slides, a cam-ring on the holder having pins in said slots and provided with a radial slot and peripheral notch, a pin on the cam engaging the slot, and an interlocking sleeve on the cam engaging the notch.

In testimony whereof I affix my signature in presence of two witnesses.

WILLIAM J. HERRICK.

Witnesses:
J. McRoberts,
Edith Wilcox.

Copies of this patent may be obtained for five cents each, by addressing the "Commissioner of Patents, Washington, D. C."